No. 875,231. PATENTED DEC. 31, 1907.
C. E. ACKER.
PROCESS OF MAKING CHLORIDS OF SULFUR.
APPLICATION FILED JULY 18, 1904.
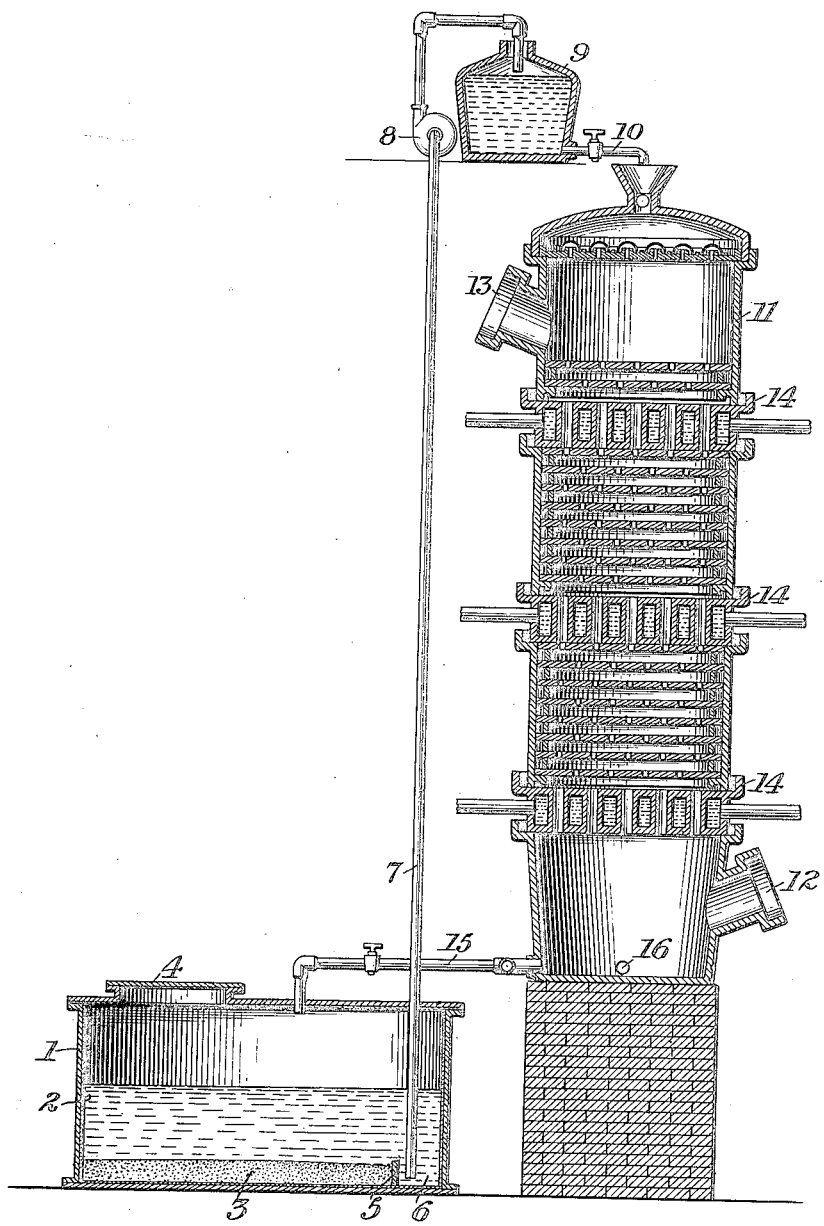
Witnesses:
R A Balderson
J. B. Hill
Inventor:
Charles E. Acker,
by Byrnes & Townsend
Att'ys.

UNITED STATES PATENT OFFICE.

CHARLES ERNEST ACKER, OF NIAGARA FALLS, NEW YORK, ASSIGNOR, BY MESNE ASSIGNMENTS, TO MARCUS STINE, OF NEW YORK, N. Y.

PROCESS OF MAKING CHLORIDS OF SULFUR.

No. 875,231.

Specification of Letters Patent.

Patented Dec. 31, 1907.

Application filed July 18, 1904. Serial No. 217,126.

*To all whom it may concern:*

Be it known that I, CHARLES ERNEST ACKER, a citizen of the United States, residing at Niagara Falls, in the county of Niagara and State of New York, have invented certain new and useful Improvements in Processes of Making Chlorids of Sulfur, of which the following is a specification.

Sulfur monochlorid, $S_2Cl_2$, is usually made by passing dry chlorin gas over melted sulfur and distilling off the chlorid from the excess of sulfur. The operation requires strong chlorin free from air, which would oxidize the sulfur. The rate of production is slow, on account of the difficulty of exposing large and continuously changing surfaces of sulfur to the chlorin.

According to the present process, sulfur is dissolved in sulfur chlorid, at ordinary temperatures, preferably to the extent of 60% or more by weight, and the solution is subjected to the action of dry chlorin gas, preferably in a reaction tower of usual type, thereby chlorinating the dissolved sulfur. The liquid is then returned to the solution vessel, resaturated with sulfur, and the cycle is continuously repeated, portions of the chlorid being withdrawn from time to time as it accumulates. The reaction towers are preferably cooled to withdraw the heat produced by the chlorination of the sulfur.

A suitable apparatus for carrying out the process is shown in the accompanying drawing, in which the figure is a vertical section through the solution tank, storage reservoir and reaction tower.

The tank 1 in which the solution of the sulfur in the sulfur chlorid is effected, is preferably an iron vessel with a lining 2 of lead. The sulfur 3 is introduced through an opening 4 and lies on the bottom of the tank, a transverse dam 5 being provided to leave a well 6 for the clear solution. A pipe 7, which may be of hard lead, leads upward from the tank 1 through a pump 8 to the storage reservoir 9. A pipe 10 having a cock delivers the solution into the upper end of the reaction tower 11. This tower is shown as of the Rohrmann type but may be of any preferred construction. The dry chlorin gas, which may contain air or oxygen but should be of fair strength, is introduced into the lower end of the tower through a passage 12 and the waste gases are withdrawn by suction from the upper end through a passage 13. The tower is provided with interposed cooling sections 14 through which water is circulated to remove the heat produced by the chlorination of the dissolved sulfur. The temperature of the liquid is preferably maintained at a point varying from normal to 60° or 70° C. It is, of course, necessary to maintain it below the distillation point of the monochlorid. The liquid is returned to the solution tank by a pipe 15 leading from the lower end of the tower, more sulfur is dissolved therein and the cycle of operations is continuously repeated. Portions of the product are withdrawn as desired, either from the solution tank or through an opening 16 at the base of the tower. A considerable body of sulfur may be maintained in the tank and one tank may be used to supply several reaction towers.

The process may be carried out under such conditions that the product is sulfur dichlorid, $SCl_2$, instead of monochlorid. For this purpose, a smaller amount of liquid is passed through the reaction tower and it is subjected to an excess of chlorin. Chlorin may also be introduced directly into the solution tank. The temperature both in the tower and tank is maintained below the volatilizing point of the dichlorid, which is between 64° and 68° C., as by passing refrigerated brine through the cooling sections of the tower and passing it through a jacket around or coils within the tank.

I claim:—

1. The process of making sulfur chlorids, which consists in dissolving sulfur in sulfur chlorid, and subjecting the solution in the absence of undissolved sulfur to the action of a gaseous body containing chlorin and a diluent, as set forth.

2. The process of making sulfur chlorid, which consists in dissolving sulfur in sulfur chlorid contained in a suitable receptacle, passing such solution into a reaction chamber, subjecting it therein to the action of a gaseous body containing chlorin, returning the product thus produced to the container, dissolving more sulfur in the product, and repeating the cycle of operations.

3. The process of making sulfur chlorids, which consists in dissolving sulfur in sulfur chlorid, subjecting the solution in the absence of undissolved sulfur to the action of a gaseous body containing chlorin and a diluent, and withdrawing the heat produced by the reaction, as set forth.

4. The process of making sulfur chlorids, which consists in dissolving sulfur in sulfur chlorid, subjecting the solution to the action of a gaseous body containing chlorin, withdrawing the heat produced by the reaction, dissolving more sulfur in the product and repeating the cycle of operations, as set forth.

5. The process of making sulfur chlorids which consists in dissolving sulfur in sulfur chlorid in a suitable dissolving chamber, transferring said solution to a re-action chamber, passing fine streams of the solution through an atmosphere containing chlorin therein, returning the product to the dissolver and dissolving more sulfur in the product, as set forth.

6. The process of making sulfur chlorids, which consists in dissolving sulfur in sulfur chlorid, passing the solution in fine streams through an atmosphere containing chlorin in a separate reaction chamber, dissolving more sulfur in the product and repeating the cycle of operations, as set forth.

7. The process of making sulfur chlorids, which consists in dissolving sulfur in sulfur chlorid, passing fine streams of the solution through an atmosphere containing chlorin, and cooling the solution to withdraw the heat produced by the reaction, at the point where the reaction takes place, as set forth.

8. The process of making sulfur chlorids, which consists in dissolving sulfur in sulfur chlorid, passing fine streams of the solution through an atmosphere containing chlorin, cooling the solution to withdraw the heat produced by the reaction, dissolving more sulfur in the product, and repeating the cycle of operations, as set forth.

9. The process of making sulfur dichlorid, which consists in dissolving sulfur in sulfur chlorid, subjecting the solution to the action of an excess of chlorin, and cooling the solution below the volatilizing point of the dichlorid, at the point where the reaction takes place, as set forth.

10. The process of making sulfur dichlorid, which consists in dissolving sulfur in sulfur chlorid, subjecting the solution to the action of an excess of chlorin, maintaining the temperature below the volatilizing point of the dichlorid, dissolving more sulfur in the product, and repeating the cycle of operations, as set forth.

In testimony whereof, I affix my signature in presence of two witnesses.

CHARLES ERNEST ACKER.

Witnesses:
GERALDINE M. McBRIDE,
JOSEPHINE F. KEOUGH.